United States Patent [19]
Blood

[11] Patent Number: 5,378,524
[45] Date of Patent: Jan. 3, 1995

[54] FRICTION REDUCING SURFACE AND DEVICES EMPLOYING SUCH SURFACES

[76] Inventor: Charles L. Blood, No. 1 Farview Ave., Atlantic Highlands, N.J. 07716

[21] Appl. No.: 24,421

[22] Filed: Mar. 1, 1993

Related U.S. Application Data

[63] Continuation-in-part of Ser. No. 706,387, May 28, 1991, Pat. No. 5,200,573.

[51] Int. Cl.⁶ .......................... B32B 3/00; B63B 1/34; B64C 1/38
[52] U.S. Cl. .................................. 428/141; 428/156; 428/212; 244/130; 114/67 R; 114/288
[58] Field of Search ............... 428/156, 141, 212, 131, 428/134, 135, 192; 244/123, 124, 126, 130; 114/67 R, 288; 180/116

[56] References Cited

U.S. PATENT DOCUMENTS

| | | | |
|---|---|---|---|
| 1,716,435 | 6/1929 | Fortheringham | 273/232 |
| 2,261,558 | 11/1941 | Orloff | 244/130 |
| 2,728,576 | 12/1955 | Martin et al. | 273/232 |
| 4,173,930 | 11/1979 | Faires, Jr. | 102/448 |
| 4,804,189 | 2/1989 | Gobush | 273/232 |
| 4,858,929 | 8/1989 | Gobush | 273/232 |
| 4,996,924 | 3/1991 | McClain | 102/501 |
| 5,171,623 | 12/1992 | Yee | 428/156 |

*Primary Examiner*—Donald J. Loney
*Attorney, Agent, or Firm*—Daniel E. Kramer

[57] ABSTRACT

An improved aerodynamic surface for the exterior of vehicles moving through a gas and vehicles employing such improved surfaces. The improved surface comprises a matrix of dimples or depressions formed into the portions of the surface of the vehicle. The improved surface is most beneficially located either at a leading edge, where the vehicle first cleaves the pool of air through which it is traveling, or on vehicle surfaces which tend to move the air pool to accommodate the presence of the vehicle itself or on vehicle surfaces to which the designer wishes to provide a lift function. Wings, ailerons and rudder surfaces are examples of surfaces to which a lift function is most applicable. The vehicle may be of the nature of an automobile, a boat or an airplane. The invention is also applicable to the internal surface of pipes for conveying fluid.

4 Claims, 2 Drawing Sheets

FRICTION REDUCING SURFACE AND DEVICES EMPLOYING SUCH SURFACES

PARENT APPLICATION

This is a continuation-in-part of patent application bearing Ser. No. 07/706,3817, filed May 28, 1991 now U.S. Pat. No. 5,200,573.

FIELD OF THE INVENTION

The present invention relates generally to surfaces which interface with a fluid such as a gas or liquid under conditions where there is relative motion between the fluid and the surface. More particularly the invention relates to the application of dimples or cavities to such surfaces. Still more particularly, the invention relates both to vehicles which are intended to move within a fluid and to the application of dimples to their external surfaces which interface with the fluid through which the vehicle moves, and to conduits within which fluids flows and to the application of dimples to their internal surfaces which interface with the flowing fluid.

For the purposes of this specification the term vehicle is intended to include internally or externally powered objects as diverse as automobiles, boats including the displacement, planing and hydrofoil types and airplanes and fans and propellers all of which have surfaces which move relative to one or more fluids.

Within this specification the terms air and gas will be employed interchangeably to refer to a single gas or a mixture of gasses including but not restricted to air and all its constituent gasses and to any other gas or gas-like material which moves relative to a surface. The term fluid will be employed to refer to any liquid or any gas.

The term lost energy is not intended to imply that energy is lost but simply that energy of motion is converted to another form of energy such as heat.

BACKGROUND OF THE INVENTION

Whenever energy is used either to propel a vehicle through a fluid or to propel a fluid through a conduit, there is energy lost because of friction between the surface and the fluid moving relative to it. The lost energy is generally evidenced by conversion of the energy lost to heat and by a slowing of the vehicle or by a pressure drop of the fluid flowing through the conduit. The lost energy must be constantly replaced to maintain the speed of the vehicle or to maintain the pressure of the fluid. In a vehicle, replacing the lost energy is achieved by supplying power to the wheels or other propelling agency such as a propeller or jet engine. In a conduit the lost energy is replaced either by increasing the initial pressure of the fluid being pumped through a conduit or by providing pumping means spaced at intervals along a pipe or conduit to increase to a higher level the pressure which had dropped to a lower level through friction.

To the extent that friction between a surface and a fluid flowing relative to the surface can be reduced, the energy required to move the vehicle through the fluid or the fluid through the conduit can be reduced. Such an energy reduction will be represented by an increase in gas mileage and range in an internally powered vehicle such as a car or boat or plane.

Further, lift is generated by fluid flow over dimpled surfaces as compared with fluid flow over similarly contoured smooth or undimpled surfaces. The lift is generated because fluid, traversing the dimpled surface, must travel further over the dimples than over a corresponding contoured smooth surface, thereby generating higher fluid velocity and lower pressure adjacent the dimpled surface, in accord with Bernoulli's theorem, whereby lift is generated by the differential pressure between the lower pressure adjacent the surface having the dimples and the higher pressure on the corresponding undimpled or smooth surface positioned on the vehicle oppositely to the dimpled surface.

RELATED ART

A golf ball has a dimpled surface. A typical golf ball is 1.67 inches in diameter (42.5 mm) and has distributed, more or less uniformly, over its surface 326 dimples or shallow cavities each about 0.138 inches in diameter (3.5 mm) and about 0.03 inches (0.8 mm) deep. The surface area of the golf ball is approximately 8.76 square inches (5652 mm$^2$). Therefore the density of the cavities is about 37 per square inch (0.057/mm$^2$).

Faires U.S. Pat. No. 4,173,930, McClain U.S. Pat. No. 4,996,924 and Groth (Sweden) 187,572 disclose dimpled projectiles of the type intended to be fired from a gun.

No other application of cavities or dimples of any size or shape to the exterior surface of a vehicle such as a car plane or boat of any sort or to the interior surface of a conduit through which a fluid flows is known to me.

SUMMARY OF THE INVENTION

The invention comprises a vehicle having an outer surface, including a matrix of cavities dispersed over a portion of the outer surface. The vehicle having such an outer surface portion is selected from the group consisting of automobile, airplane and boat.

BRIEF DESCRIPTION OF THE DRAWINGS

The foregoing summary as well as the following description of preferred embodiments of the present invention will be better understood when read in conjunction with the appended drawings. For the purpose of illustrating the invention there are shown in the drawings embodiments which are presently preferred, it being understood, however, that the invention is not limited to the specific instrumentalities or the precise arrangements disclosed.

Figure 1:
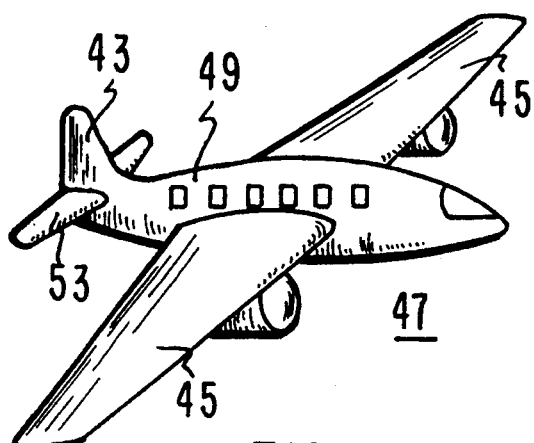

BRIEF DESCRIPTION OF THE DRAWINGS:

FIG. 1 is a view in perspective of an airplane having surfaces to which the present invention is applied.

FIGS. 2, 3, 4 and 5 are representations of surfaces containing cavities of the present invention.

Figure 6:
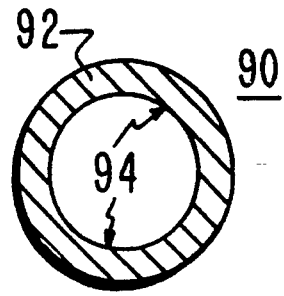

FIG. 6 is a cross-section of a fluid carrying pipe having an inner surface to which the present invention is applied.

Figure 7:
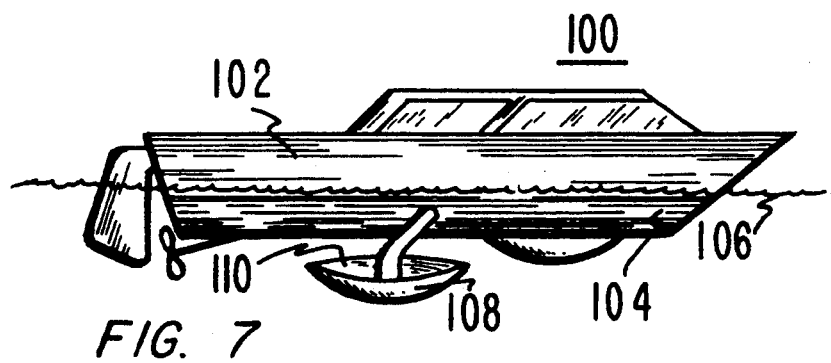

FIG. 7 is a boat having surfaces to which the present invention is applied.

Figure 8:
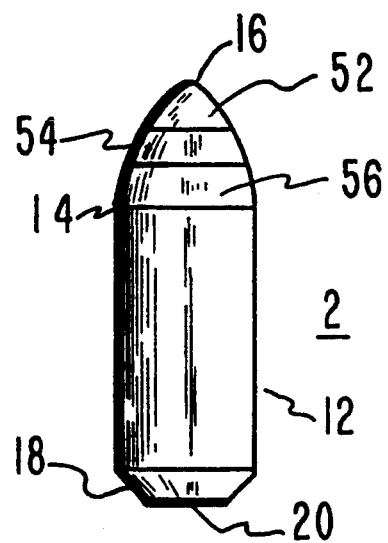

FIG. 8 is a plan view of the leading edge of a vehicle surface having zones of different radius of surface curvature.

DETAILED DESCRIPTION OF THE INVENTION

Figure 2:
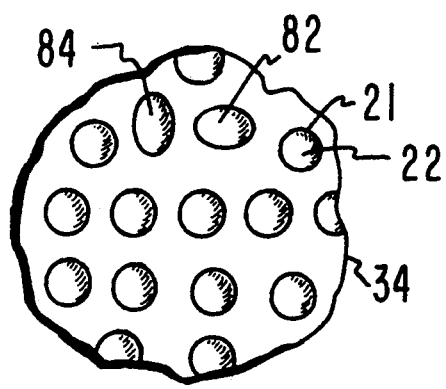

Referring now to the drawings, there is shown in FIG. 2 a planar surface 34. In FIG. 2 there are also shown cavities having similar sizes positioned within surface 34. Round cavities 21 having shape 22, have a diameter 70 and a depth 72 as displayed in detail in the enlarged cross-section of a cavity shown in FIG. 4.

Oval cavities 82 and 84 have their major axes positioned at right angles to each other.

Figure 4:
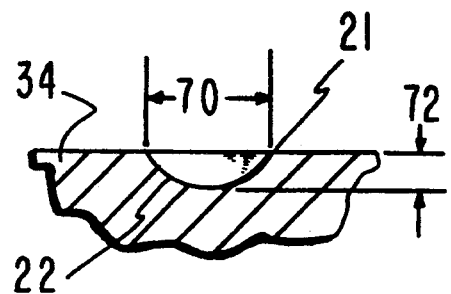

Referring further to FIG. 4 there is shown a cross-section of surface 34, the section having been taken through a cavity 21 which is embedded or formed within surface 34. Cavity 21 has a generally spherical surface 22 and a diameter 70 measured at the surface of plane 34.

Figure 5:
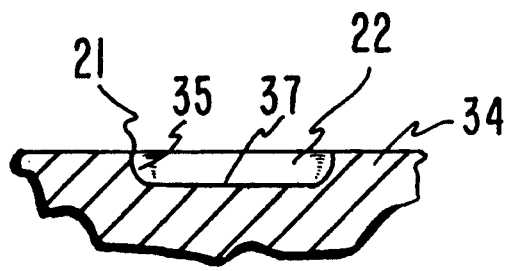

In an embodiment of the present invention as shown in cross-section in FIG. 5, the cavity diameter 70 (FIG. 4) is large compared to the extent or the thickness of the planar surface. In the cavity 21 of FIG. 5, which is formed in surface 34, the peripheral cavity surfaces 35 positioned adjacent surface 34 are generally spherical. However, to control the depth of the cavity 21 when that cavity is formed in thin skin sections 34, such as are found in airplanes, the spherical surface 35 is truncated by a plane 37, positioned substantially parallel to surface 34.

Figure 3:
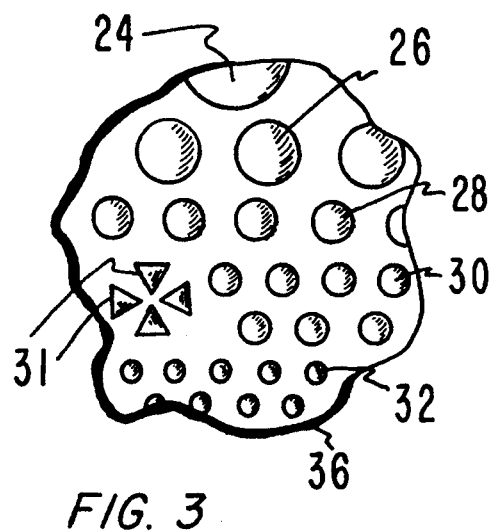

In FIG. 3 there is shown surface 36 having cavity groups 26, 28, 30 and 32 which are also applicable to the external surfaces of various vehicles. These groups are substantially spherical and are distinguished from each other by the cavity size, cavity 26 being the largest and cavity 32 being the smallest. In FIG. 3 is also displayed a matrix 31 polygonal cavities each having three sides. In other embodiments of the present invention, other polygonal forms having 4, 5, 6 or more sides are also employed.

The size and shape of the cavities applied to a vehicle surface are related to the size of the vehicle and the minimum radius of curvature of the surface to which they are to be applied. The most effective use of the cavities is their application to leading edges of the vehicle, that is the surface portions which first interface with the fluid through which the vehicle travels. Most vehicles include surfaces having a compound curvature. That is, surfaces at a point on which the radius of curvature varies depending on the direction in which it is measured. Every point therefore exhibits a minimum radius of curvature which is the minimum radius that can be measured at that point. An effective rule for relating the diameter of the cavities (D) to the minimum radius of curvature (MRC) of the surface to which the cavity matrix is to be applied for the purposes of this invention, is $$D = 0.0306 * (MRC^{0.695})$$

where D is the cavity diameter in inches and MRC is the minimum radius of curvature measured in inches.

The values of cavity diameter (D) in inches for a range of minimum radius of curvature (MRC) in inches, established by this relationship is set forth in the table below. Although this relationship is expected to provide the most efficient cavity diameter for each minimum radius of surface curvature, it should be understood that a variation of plus or minus 20 percent will have only minor effect on the efficiency.

| MRC (inches) | Cavity Diameter (inches) |
|---|---|
| .25 | 0.012 |
| .5 | 0.019 |
| 1.0 | 0.031 |
| 5 | 0.094 |
| 12 | 0.172 |
| 45 | 0.431 |
| 95 | 0.725 |

The following formula, provides the cavity diameter in mm providing the MRC is entered also in mm.

$$D(mm) = 0.0841 * (MRC(mm)^{0.6913})$$

Typically the cavities range in diameter from 0.010 inches (0.25 mm) to 0.75 inches (19 mm). In other embodiments of the invention, the cavities are equilateral triangles 31, in still other embodiments the cavities are polygons with other numbers of sides, typically, 4,5 or 6. The cavity dimensions preferred, as defined within plus or minus twenty percent by the above formula, are diameters, if the cavities are circular. Where the cavities are polygonal, the dimensions calculated apply to the measurement between the most widely separated vertexes.

The cavity depth ranges from 5 percent to 40 percent of the cavity diameter, depending in part on the diameter of the cavity and in part on the thickness of the surface material.

The percent of a surface portion occupied by cavities ranges from 30 percent to 95 percent. The higher percentage coverage is achievable only with cavities having a polygonal form, the coverage of the surface portion depending on the degree of effectiveness, and where lift is desired, the degree of lift desired.

FIG. 1 displays an airplane whose external surfaces are completely covered with skin having cavities exemplified by FIGS. 2 and 4. The reduction in air resistance provided by the cavities generates the advantages of higher speeds and increased range for the same fuel load.

Referring again to the airplane of FIG. 1 there is shown a fuselage 49, wings 45 and tail section having elevator parts 53 and rudder parts 43. The forward most part of the fuselage 49 is best illustrated by reference to FIG. 8 in which body portion 12 houses the cockpit. There is shown a tapered nose portion having three zones; zone 52 which is closest to the leading edge tip 16, zone 56, which is closest to the body portion 12, and zone 54 which is between zones 52 and 56 and contiguous to both. In one embodiment of the present invention, the cavities of FIG. 3 are embedded into the surface of the nose portions 52, 54 and 56 of body portion 12 as illustrated in FIG. 8. The smallest cavities 32 are embossed into the conical zone 52, closest to the tip 16 of the projectile. Larger cavities 30 are embossed into zone 54. Still larger cavities 28 are embossed into the surface of vehicle zone 56. Typically, the cavities have diameters ranging from 0.75 percent to 1.5 percent of the minimum radius of curvature of the surfaces to which they are applied.

In an alternate construction, FIG. 8 is an end view of a wing 45 showing leading edge 16 and matrix zones 52. 54 and 56 having progressively larger minimum radius of curvatures and therefore larger cavities, the upper and lower surfaces of the wing having the largest minimum radius of curvature and therefore the largest cavities.

For ease of manufacture, in another embodiment of the invention, cavities having only one diameter, the diameter being either the smallest or an intermediate size, are applied to all three zones 52, 54 and 56. In another embodiment of the present invention, nose portions 52, 54 and 56 of vehicle 12 are rounded and the rounded nose portion includes cavities of the same or varying size dispersed over the nose portion area. In still another embodiment of the present invention, cavities are dispersed over the entire surface of the airplane including the body portion 12. In other embodiments of the present invention only the upper surface 45 of the wings are covered with cavities, thereby providing additional lift.

In another embodiment of the present invention as applied to the skin of airplanes, equilateral hexagonal cavities having a dimension 0.200 inches (5.1 mm), measured across two most widely separated vertices, are spaced to provide 40 percent coverage. The cavities have the form of FIG. 5 and have a cavity depth of 0.010 inches (0.25 mm).

Where the surface material is not suitable for casting, the cavities are rolled, swaged or stamped into material such as metals or polymers, comprising the vehicle surface. The method of manufacture of the surface embodying the cavities is not part of the present invention.

FIG. 8, as applied to an automobile, shows a portion of the front of a car body 12 on which different size cavities are arranged in matrixes, the cavity sizes depending on the radius of curvature of the surfaces to which they are applied, all as set forth above. Zone 52 has on its surface a matrix of cavities having a smaller diameter 70 (FIG. 4), consistent with the smaller radius of curvature of the surface to which the cavities are applied. The zone 56, having a much larger radius of curvature, has on its surface cavities having a diameter 70 which is substantially larger. The zone 54 having a radius of curvature which is intermediate to that of zones 52 and 56, has its surface covered with cavities whose size is intermediate to the cavity sizes on zones 52 and 56.

In FIG. 6 is shown a cross-section of a pipe 90 for conveying a fluid. The pipe 90 has a wall 92 having an interior surface 94. The interior surface 94 is provided with cavities sized and positioned in accord with the present invention, thereby providing lower pressure drop and reduced energy loss attributable to such flow. Since pipe sizes are generally selected based on the pressure drop expected for the pipe length required, a concomitant advantage is that a reduced pipe size, having an internal surface manufactured in accord with my invention, may be employed in some cases compared with standard pipes having smooth internal surfaces.

In one embodiment of the present invention a water carrying pipe having a 4 inch inside diameter (102 mm) has round internal cavities having diameters of 0.050 (1.3 mm) inches, spaced to provide 25 percent coverage. For initial testing, the diameters of the cavities are best selected in accordance with the exponential relationship set forth above.

The boat 100 of FIG. 7 has a water-line 106 dividing the hull into an above water-line portion 102 and a submerged portion 104. Cavities of the present invention as described in connection with FIGS. 2 through 5, are applied to submerged hull surface 104 to facilitate the movement of the boat through the water, thereby increasing boat speed and reducing fuel consumption.

In another embodiment of the present invention as applied to a boat 100 equipped with hydrofoils 108 which enable the displacement hull of the boat to be lifted out of the water during forward motion, the required lift is effectuated by dimpling the upper surfaces 110 of the foil and decreasing the angle of attack. With this construction, the required lift is achieved with a much lower drag coefficient.

From the foregoing description it can be seen that the present invention comprises an advanced surface for vehicles moving within a gaseous environment and reduced pressure drops and energy losses for pipes employing the advanced surface. It will be appreciated by those skilled in the art that changes could be made to the above-described embodiments without departing from the broad inventive concepts thereof. It is understood, therefore, that this invention is not limited to the particular embodiments disclosed, but is intended to cover all modifications which are within the scope and spirit of the invention as defined by the appended claims.

I claim:

1. In a vehicle selected from the group consisting of airplane, automobile and boat, the vehicle intended to move through a fluid, the vehicle having an outer surface, a first portion of such outer surface having a first minimum radius of curvature (MRC), a second portion of such outer surface having a second smaller minimum radius of curvature (MRC), and a third portion, the improvement comprising, a matrix of substantially radially symetrical cavities having a diameter, the cavities being dispersed over the first and over the second portions only, the diameter of the cavities dispersed over the second portion being smaller than the matrix of cavities dispersed over the first portion.

2. A vehicle as recited in claim 1 where the first and second surface portions are contiguous.

3. A vehicle as recited in claim 2 where the diameter of the cavities in each portion has a diameter D multiplied by a single factor selected from the group of decimal numbers between 0.8 and 1.2 inclusive and where D (in inches) for each portion is determined from its MRC (in inches) by the expression:

$$D = 0.0306 * MRC^{0.695}.$$

4. A vehicle as described in claim 2 where the cavities have the shape of a regular polygon having at least three apexes and the value of D is the distance between the two most widely separated apexes within a single cavity.

* * * * *